UNITED STATES PATENT OFFICE.

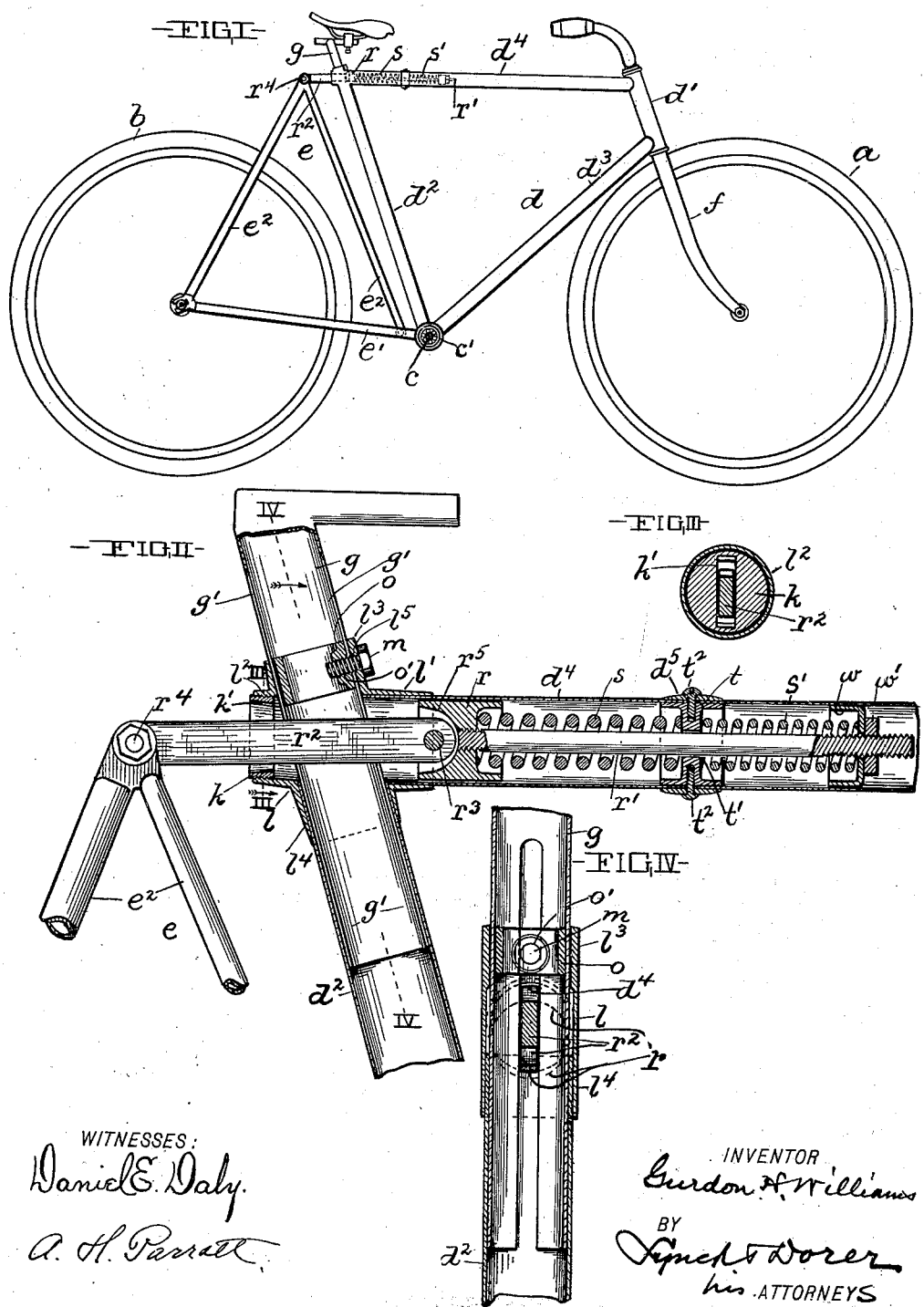

GURDON H. WILLIAMS, OF SOUTH BROOKLYN, OHIO.

SPRING-FRAME FOR BICYCLES.

SPECIFICATION forming part of Letters Patent No. 644,957, dated March 6, 1900.

Application filed September 5, 1899. Serial No. 729,507. (No model.)

*To all whom it may concern:*

Be it known that I, GURDON H. WILLIAMS, a resident of South Brooklyn, county of Cuyahoga, and State of Ohio, have invented certain new and useful Improvements in Spring-Frames for Bicycles; and I do hereby declare the following to be a full, clear, and exact description of the invention, such as will enable others skilled in the art to which it pertains to make and use the same.

My invention relates to improvements in spring-frames for bicycles, and more especially to a bicycle-frame composed of two sections arranged the one forward of the other and having both of the said sections hinged together at the bottom and having a novel and exceedingly-meritorious spring connection at their upper ends.

The invention consists in certain features of construction and combinations of parts, hereinafter described, and pointed out in the claims.

In the accompanying drawings, Figure I is a side elevation of a bicycle having a frame embodying my invention. Fig. II is a side elevation, mostly in central longitudinal section, of the upper portion of the framework of the machine and illustrating very clearly my improved spring connection between the two sections of the frame. Fig. III is a vertical section on line III III, Fig. II, looking forwardly. Fig. IV is a section on line IV IV, Fig. II, looking forwardly.

Referring to the drawings, $a$ designates the forward wheel of a bicycle; $b$, the rear or driven wheel; $c$, the operating-shaft, and $d$ and $e$ are the two sections of the framework, arranged the one forward of the other and hinged together at the bottom of the machine in any approved manner, as at $c'$. The forward frame-section $d$ is connected in the usual manner with the forward wheel. The rear frame-section $e$ is connected in the usual manner with the rear or driven wheel. The forward frame-section extends somewhat over the forward wheel and is there provided with the ordinary bearing $d'$ for the steering-fork $f$, that forms the connection between the said frame-section and the forward wheel. The frame-section $d$ comprises two tubular bars $d^2$ and $d^3$, that extend and diverge upwardly from the hinge connection between the two frame-sections. The rear bar $d^2$ of the forward frame-section carries the saddle-post $g$ of the machine, and the forward bar $d^3$ of the said frame-section connects at its forward end with the bearing for the steering-fork. The said bars $d^2$ and $d^3$ are arranged in the same vertical plane longitudinally of the machine. The bearing $d'$ is connected at its upper end with the rear upright bar $d^2$ of the forward frame-section by a horizontally-arranged bar $d^4$ and cross-shaped or four-armed connection $l$. The rear frame-section $e$ is preferably a triangular frame comprising upwardly-extending and converging bars $e^2$, that are connected at their upper ends by my improved form of spring connection with the top of the forward frame-section $d$. The part $l$ has a forwardly-projecting arm $l'$, embracing and brazed onto the rear end of the bar $d^4$. Member $l$ has a rearwardly-projecting arm $l^2$, that is screw-threaded internally and engaged by the correspondingly-threaded guide $k$. Arms $l$ and $l^2$ are arranged in line and in a horizontal plane. Part $l$ has an upwardly-projecting and rearwardly-inclined arm $l^3$, that embraces the saddle-post $g$. Member $l$ has a downwardly-projecting and forwardly-inclined arm $l^4$, that embraces and is brazed onto the rear upright bar $d^2$ of the forward frame-section below the arms $l'$ and $l^2$. Members $l^3$ and $l^4$ are arranged in line. The saddle-post extends downwardly into the bar $d^2$ through the arms $l^3$ and $l^4$ of the part $l$, and the means employed for securing the said post in the desired adjustment comprises, preferably, a screw $m$, that extends loosely through a perforation $l^5$, formed in the arm $l^3$, into and engages a correspondingly-threaded hole $o'$, formed in the ring-shaped clamp $o$, that fits easily within the saddle-post, that is hollow and split or slotted, as will hereinafter more fully appear. Upon tightening the screw $m$ the clamp is caused to tightly clamp the saddle-post against one side of the arm $l^3$.

A spiral spring $s$ is confined within the rear portion of the bar $d^4$, between the forward side of an endwise-shiftable block or slide-forming piece $r$, that is arranged within the rear portion of the said bar $d^4$ and the rear side of a stationary block or piece $t$, that is arranged within and fixed to the bar $d^4$. A rod $r'$ extends centrally and easily through member $t$. The rod $r'$ has its rear end screw-threaded externally, and the sliding piece $r$ is correspondingly internally threaded and mounted upon the said end of the rod $r'$. A link $r^2$ extends longitudinally through the arms $l'$ and $l^2$ of the part $l$. The said link at its forward end is pivoted horizontally, as at $r^3$, to the slide $r$, and consequently operatively connected with the rod $r'$. The link $r^2$ has its rear end pivoted horizontally, as at $r^4$, to the upper end of the rear frame-section of the framework of the machine. Member $k$ is slotted, as at $k'$, to accommodate the location and operation of the link $r^2$, and the side walls of the said slot are arranged to form a lateral guide for the link. The sliding nut $r$ is cut away internally of its rear end, as $r^5$, to accommodate the reception and operation of the connected end of the link $r^2$. The stationary piece $t$ has a centrally-located hole $t'$ extending therethrough to accommodate the location and operation of the spring-bearing rod $r'$ and is secured to the supporting-bar $d^4$ by any suitable number of screws $t^2$, that engage correspondingly-threaded holes formed in the said piece $t$. The bar $d^4$ is preferably reinforced at the location of the spring-abutment-forming piece $t$ by a collar $d^5$, that embraces and is brazed onto the bar $d^4$, and the screws employed in securing the said piece $t$ to the bar $d^4$ extend through the collar and have their heads abutting against the external surface of the collar. Another spring $s'$ is confined within the bar $d^4$, between the forward face of the piece $t$ and the rear surface of a slide-forming piece $w$, that is arranged within and shiftable endwise of the said bar a suitable distance forwardly of the spring-abutment-forming piece $t$. The spring-bearing rod extends forwardly through the slidable piece $w$ and is screw-threaded at its forward end, and a nut $w'$, mounted upon the said threaded portion of the rod forward of member $w$, prevents the latter from shifting forwardly independently of the spring-bearing rod and is instrumental in regulating the tension of the spring $s'$. The rear spring $s$ is about twice as heavy as the forward spring $s'$.

The operation of my improved spring connection between the two frame-sections $d$ and $e$ is as follows: When the rear or driven wheel strikes an obstruction and is thereby lifted so as to tilt the rear frame-section forwardly and upwardly, the link $r^2$ will be actuated forwardly and thereby cause the shiftable bar $r$ to compress the spring $s$, that consequently greatly relieves the operator or rider from the shock that would otherwise result from the striking of the obstruction. Of course the location of the rider's saddle over the forward portion of the rear or driven wheel renders the spring connection between the two frame-sections particularly desirable. Yet an obstruction encountered by the forward wheel and lifting or elevating the said wheel would result in tilting the forward frame-section upwardly and rearwardly and thereby compress the spring $s$ more or less against the slide-forming block $r$, whose presence, notwithstanding the endwise shiftability of the same, will compress the spring and thereby relieve the rider of the shock that he would sustain in the absence of the spring connection. To avoid the jarring or vibration of the framework incidental to the recoil of the spring $s$ after the obstruction-striking wheel has surmounted the obstruction, the auxiliary spring $s'$ comes into play, because it is obvious that during the compression of the spring $s$ during the upwardly and forwardly tilting of the rear frame-section, as well as during the compression of the said spring during the upwardly and rearwardly tilting of the forward section, the auxiliary spring is distended and thereby placed in condition to suitably counteract the reactive force occasioned by the recoil of the spring $s$. The spring $s'$ is normally under the tension required to somewhat compress the spring $s$. The weight of the rider would also somewhat compress the spring $s$. The pivotal connection between the link $r^2$ and the spring-bearing rod and rear frame-section is obviously necessary to accommodate the vertical tilting or vibration of either frame-section independently of the other frame-section.

The peculiar construction and arrangement of parts illustrated is especially desirable on account of its durability, simplicity, and efficiency, and the springs and the spring-bearing rod are out of the way and inclosed in the top bar $d^4$ of the forward frame-section.

The saddle-post $g$ is split, as already indicated, as at $g'$, from its lower extremity upwardly to and near its upper end, so as to render it capable of straddling the link $r^2$ and thereby accommodating the location and operation of the said link during any adjustment of the post.

What I claim is—

1. The combination with a bicycle's framework comprising a forward section and a rear section horizontally and transversely hinged together at the bottom: of a spring confined within the forward frame-section; a stationary piece forming an abutment for one end of the said spring; a slidable piece forming an abutment for the other end of the spring; a link operatively connected with the said slidable piece and pivoted to and transversely of the rear frame-section; another spring, that is lighter than the aforesaid first-mentioned spring, confined within the forward frame-section; a stationary abutment for one end of the lighter spring, a slidable abutment for the other end of the lighter spring, and a rod having a member overlapping the outer end of the movable abutment of the lighter spring, and suitably connected with the movable abutment of the heavier spring, substantially as and for the purpose set forth.

2. The combination with a bicycle's framework comprising a forward section and a rear section horizontally and transversely hinged together at the bottom: of a spring confined within the forward frame-section; a stationary piece forming an abutment for one end of the said spring; a slidable piece forming an abutment for the spring's other end; a link operatively connected with the said slidable piece and pivoted to and transversely of the rear frame-section; another spring, that is lighter than the aforesaid first-mentioned spring, confined within the forward frame-section; a stationary abutment for one end of the lighter spring, a slidable abutment for the other end of the lighter spring, and a rod having a member overlapping the outer end of the movable abutment of the lighter spring and suitably connected with the movable abutment of the heavier spring, and the arrangement of parts being such that the lighter spring is normally under tension and somewhat places the heavier spring under tension, substantially as and for the purpose set forth.

3. The combination with a bicycle's framework having a forward section and a rear section horizontally and transversely hinged together at the bottom: of a forwardly and rearwardly extending rod arranged within the forward frame-section; a slide-forming member formed upon the rear end of the said rod; a member loosely embracing the said rod a suitable distance forward of the said slide-forming member and rigid with the forward frame-section; a spiral spring confined upon the said rod between the rear end of the said rod-embracing piece and the forward end of the aforesaid slide-forming member; another slide-forming member held to the said rod a suitable distance forward of the aforesaid rod-embracing piece; a spring, that is lighter than the first-mentioned spring, confined upon the rod between the said rod-embracing piece and the last-mentioned slide-forming member, and a link operatively connecting the first-mentioned slide-forming member with the rear frame-section, substantially as and for the purpose set forth.

4. The combination with a bicycle's framework having a forward section and a rear section horizontally and transversely hinged together at the bottom; of a forwardly and rearwardly extending rod arranged within the forward frame-section; a slide-forming member formed upon the rear end of the said rod; a stationary member loosely embracing the said rod a suitable distance forward of the said slide-forming member and rigid with the forward frame-section; a spiral spring mounted upon the rod between the said stationary piece and the aforesaid slide-forming member; another slide-forming member held to the said rod a suitable distance forward of the aforesaid stationary rod-embracing piece; a spiral spring, that is lighter than the first-mentioned spring, confined upon the rod between the said stationary piece and the last-mentioned slide-forming member, and a link operatively connecting the first-mentioned slide-forming member with the rear frame-section, substantially as and for the purpose set forth.

5. The combination with a bicycle's frame comprising a forward section and a rear section suitably hinged together at the bottom: of a forwardly and rearwardly extending rod arranged within the upper portion of the forward frame-section, and having opposite ends screw-threaded externally, a suitably-supported slide-forming nut mounted upon the rear end of the rod; a slide-forming member mounted upon the forward portion of the rod; a nut engaging the rod forwardly of the last-mentioned slide-forming member; two spiral springs mounted upon the said rod between the said slide-forming members and arranged the one forward of the other; a piece rigid with the forward frame-section and arranged between and holding apart adjacent ends of the springs; a link operatively connecting the rear slide-forming member with the rear frame-section, and the forward spring being lighter than the rear spring, substantially as and for the purpose set forth.

6. The combination with a bicycle's framework, comprising the forward section $d$ and the rear section $e$ transversely hinged together at the bottom: of the springs $s$ and $s'$; the piece $t$ rigid with the forward frame-section; the slide-forming nut $r$; the rod $r'$; the link $r^2$; the slide-forming member $w$, and the nut $w'$, all arranged and operating substantially as shown, for the purpose specified.

7. The combination with a bicycle's framework having a forward section comprising an upper forwardly and rearwardly extending tubular bar $d^4$, and a rear section hinged to and transversely of the forward section at the bottom of the framework: of the springs $s$ and $s'$; the piece $t$; the slide-forming nut $r$; the rod $r'$; the link $r^2$; the slide-forming member $w$, and the nut $w'$, all arranged and operating substantially as shown, for the purpose specified.

8. The combination with a bicycle's framework comprising a forward frame-section having an upper forwardly-extending tubular bar $d^4$, and a tubular saddle-post standard $d^2$; the rear frame-section hinged to and transversely of the forward frame-section at the bottom of the framework, and the hollow cross-shaped piece $l$ secured to the said bar and standard and having a rearwardly-projecting arm $l^2$: of a spiral spring arranged within the aforesaid bar; a slide-forming member $r$ forming an abutment for the rear end of the spring; another member $t$ forming an abutment for the forward end of the spring and rigid with the bar; a link $r^2$ operatively connecting the slide-forming member with the rear frame-section and extending through the aforesaid rearwardly-projecting arm, and a lateral guide for the said link within the said arm.

9. The combination with a bicycle's framework comprising a forward frame-section having an upper forwardly and rearwardly extending tubular bar $d^4$, and a tubular saddle-post standard $d^2$; the rear frame-section hinged to and transversely of the forward frame-section at the bottom of the framework, and a hollow piece $l$ connecting the said bar and standard and having an upwardly-projecting tubular arm and a depending tubular arm arranged in line; a spiral spring arranged within the aforesaid bar; a slide-forming member $r$ forming an abutment for the rear end of the spring; another member $t$ forming an abutment for the spring's forward end and rigid with the bar; a link $r^2$ operatively connecting the slide-forming member with the rear frame-section; of the saddle-post extending through the aforesaid tubular arms and split longitudinally from its lower end upwardly as required to render the post capable of straddling the aforesaid link, and means for clamping the saddle-post to the upper tubular arm and comprising the internal clamping-ring $o$ and the screw $m$.

Signed by me at Cleveland, Ohio, this 8th day of August, 1899.

GURDON H. WILLIAMS.

Witnesses:
C. H. DORER,
A. H. PARRATT.